United States Patent
Bora et al.

(10) Patent No.: US 11,709,614 B2
(45) Date of Patent: Jul. 25, 2023

(54) REDUCING WRITE DELAYS WHILE TAKING SNAPSHOTS

(71) Applicant: EMC IP Holding Company LLC, Hopkinton, MA (US)

(72) Inventors: Bhaskar Bora, Shrewsbury, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 17/383,752

(22) Filed: Jul. 23, 2021

(65) Prior Publication Data

US 2023/0022243 A1   Jan. 26, 2023

(51) Int. Cl.
*G06F 3/06* (2006.01)

(52) U.S. Cl.
CPC ............ *G06F 3/065* (2013.01); *G06F 3/0611* (2013.01); *G06F 3/0659* (2013.01); *G06F 3/0664* (2013.01); *G06F 3/0673* (2013.01)

(58) Field of Classification Search
CPC ...... G06F 3/065; G06F 3/0611; G06F 3/0659; G06F 3/0664; G06F 3/0673
See application file for complete search history.

(56) References Cited

U.S. PATENT DOCUMENTS

| | | | |
|---|---|---|---|
| 7,340,489 B2 | 3/2008 | Vishlitzky et al. | |
| 9,965,216 B1 | 5/2018 | Jaganathan et al. | |
| 11,188,425 B1 | 11/2021 | Tobin et al. | |
| 2018/0032272 A1* | 2/2018 | Sato | G06F 12/0638 |
| 2019/0340292 A1* | 11/2019 | Chandrashekhara | G06F 3/065 |
| 2022/0121532 A1* | 4/2022 | Vandrovec | G06F 11/2028 |

* cited by examiner

*Primary Examiner* — Zhuo H Li
(74) *Attorney, Agent, or Firm* — Muirhead and Saturnelli, LLC

(57) ABSTRACT

Snapshots are processed without holding all write operations while the snapshots are being activated. Rather than holding all write operations until snapshots are activated, write operations may be allowed to proceed. Snapshot write processing may be temporarily suspended while the snapshots are being activated, including snapshot metadata being updated, while write operations received while the snapshots are being activated are logged. After snapshots have been activated for all logical LSUs for which snapshots were instructed to be activated, the logging of write operations may be stopped, and the logged write entries processed to determine whether any of the logged write operations require updating snapshot information of any logical storage elements (LSEs) of the LSUs. While the logged write operations are being processed, any write operations received from a host for an LSE having a logged write operation may be held until the held operation, or all held operations are processed.

15 Claims, 11 Drawing Sheets

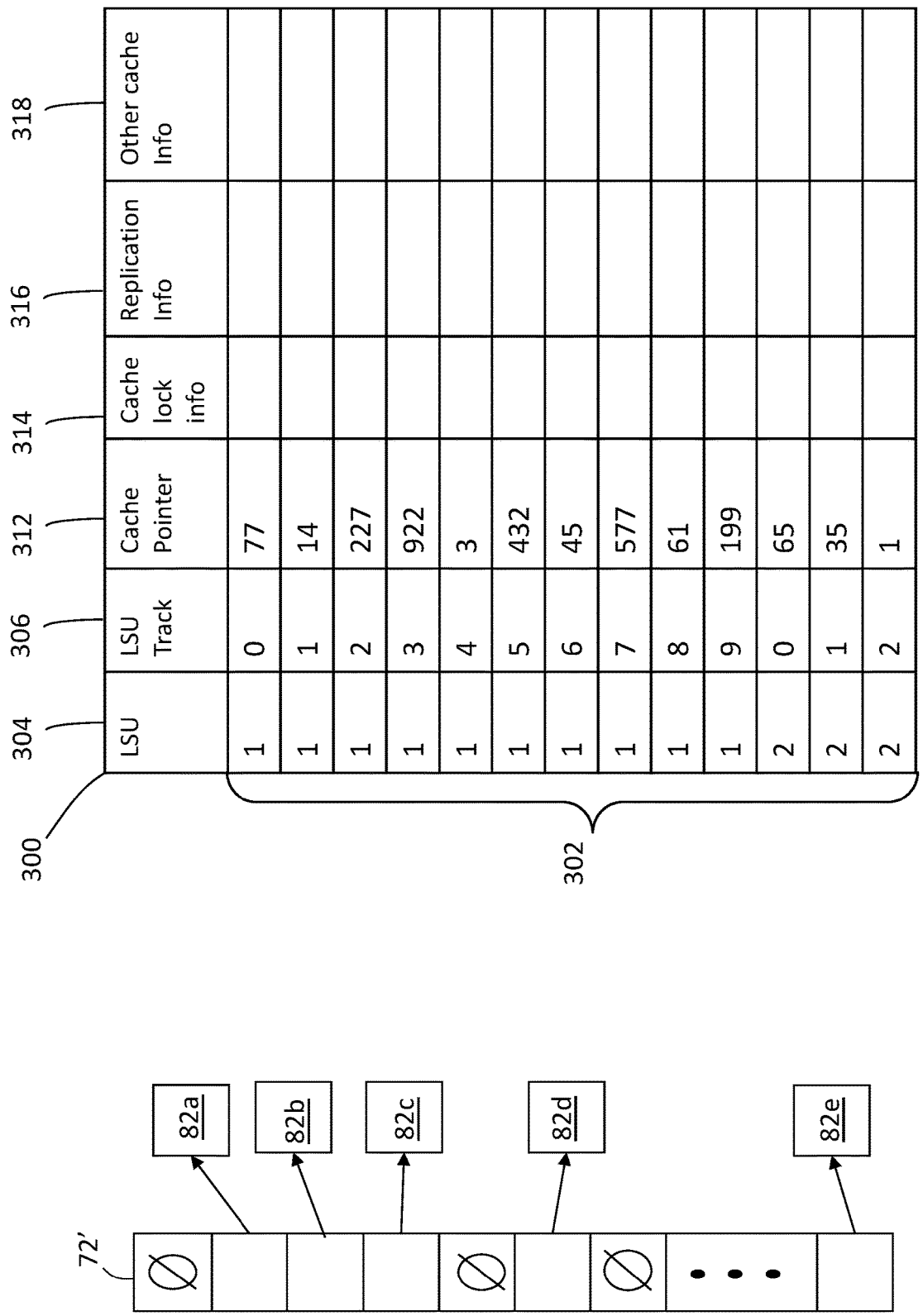

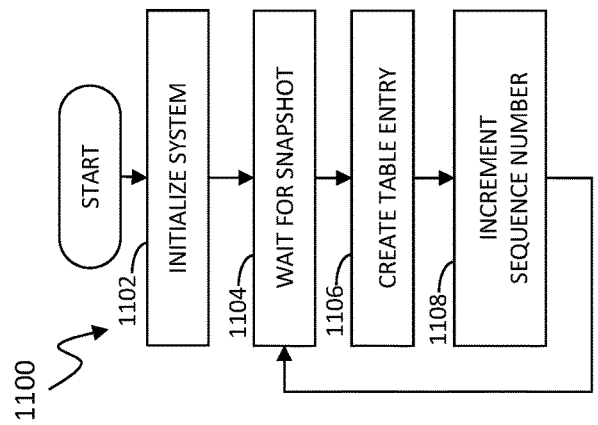
FIG. 9
FIG. 10
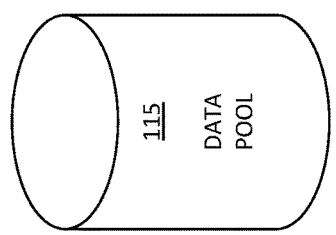
FIG. 7
FIG. 8

REDUCING WRITE DELAYS WHILE TAKING SNAPSHOTS

BACKGROUND

Technical Field

This application generally relates to data storage networks, and more particularly to taking snapshots on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment, a method includes: receiving an instruction to activate a first snapshot for one or more logical storage units including a first logical storage unit; in response to receiving the instruction, initiating logging of write operations received for the one or more logical storage units; in response to completing activation of the first snapshot, stopping the logging of the write operations; processing the one or more logged write operations to determine whether there are one or more logged write operations that require updating snapshot information of the one or more logical storage units; and, if there are one or more logged write operations that require updating the snapshot information, updating the snapshot information based on the one or more logged write operations. The method further may include: in response to receiving the instruction, setting a first flag indicating that the first snapshot is incomplete; and clearing the first flag after updating the snapshot information. The method further may include: after completing activation of the first snapshot, receiving a first write operation for a first logical storage element of the first logical storage unit; determining whether there is at least one logged write operation for the first logical storage element that has not been processed yet; and, if there is at least one logged write operation for the first logical storage element that has not been processed yet, holding processing of the first write operation. The method further may include, after processing the one or more logged write operations, processing the held first write operation. Logging of write operations for the one or more logical storage units may include, for a first received write operation, recording a log entry specifying a first logical storage element specified by the first received write operation. Completing activation of the first snapshot may include incrementing a snapshot value of the first logical storage unit from a previous snapshot value of the first logical storage unit, where the log entry may specify a first snapshot value of the first logical storage element at a time at which the first received write operation was received, where determining whether there are one or more logged write operations that require updating the snapshot may include comparing a first snapshot value of the logical storage element to the previous snapshot value of the first logical storage unit, and where, if the first snapshot value is less than the previous snapshot value, the first received write operation may require updating the snapshot. Updating the snapshot information based on the one or more logged write operations may include: moving data pointed-to by the first logical storage element for the first snapshot value; and updating the first snapshot value of the first logical storage element to equal the previous snapshot value of the logical storage unit.

In another embodiment, a system including executable logic that implements a method including: receiving an instruction to activate a first snapshot for one or more logical storage units including a first logical storage unit; in response to receiving the instruction, initiating logging of write operations received for the one or more logical storage units; in response to completing activation of the first snapshot, stopping the logging of the write operations; processing the one or more logged write operations to determine whether there are one or more logged write operations that require updating snapshot information of the one or more logical storage units; and, if there are one or more logged write operations that require updating the snapshot information, updating the snapshot information based on the one or more logged write operations. The method further may include: in response to receiving the instruction, setting a first flag indicating that the first snapshot is incomplete; and clearing the first flag after updating the snapshot information. The method further may include: after completing activation of the first snapshot, receiving a first write operation for a first logical storage element of the first logical storage unit; determining whether there is at least one logged write operation for the first logical storage element that has not been processed yet; and, if there is at least one logged write operation for the first logical storage element that has not been processed yet, holding processing of the first write operation. The method further may include, after processing the one or more logged write operations, processing the held first write operation. Logging of write operations for the one or more logical storage units may include, for a first received write operation, recording a log entry specifying a first logical storage element specified by the first received write operation. Completing activation of the first snapshot may include incrementing a snapshot value of the first logical storage unit from a previous snapshot value of the first logical storage unit, where the log entry may specify a first snapshot value of the first logical storage element at a time at which the first received write operation was received, where determining whether there are one or more logged write operations that require updating the snapshot may include comparing a first snapshot value of the logical storage element to the previous snapshot value of the first logical storage unit, and where, if the first snapshot value is less than the previous snapshot value, the first received write operation may require updating the snapshot. Updating the snapshot information based on the one or more logged write operations may include: moving data pointed-to by the first logical storage element for the first snapshot value; and updating the first snapshot value of the first logical storage element to equal the previous snapshot value of the logical storage unit.

In another embodiment, computer-readable media has software stored thereon including: executable code that controls receiving an instruction to activate a first snapshot for one or more logical storage units including a first logical storage unit; executable code that controls, in response to receiving the instruction, initiating logging of write operations received for the one or more logical storage units; executable code that controls, in response to completing activation of the first snapshot, stopping the logging of the write operations; executable code that controls processing the one or more logged write operations to determine whether there are one or more logged write operations that require updating snapshot information of the one or more logical storage units; and executable code that controls, if there are one or more logged write operations that require updating the snapshot information, updating the snapshot information based on the one or more logged write operations. The software further may include: executable code that controls, in response to receiving the instruction, setting a first flag indicating that the first snapshot is incomplete; and executable code that controls clearing the first flag after updating the snapshot information. The software further may include: executable code that controls, after completing activation of the first snapshot, receiving a first write operation for a first logical storage element of the first logical storage unit; executable code that controls determining whether there is at least one logged write operation for the first logical storage element that has not been processed yet; and executable code that controls, if there is at least one logged write operation for the first logical storage element that has not been processed yet, holding processing of the first write operation. The software further may include executable code that controls, after processing the one or more logged write operations, processing the held first write operation. Logging of write operations for the one or more logical storage units may include, for a first received write operation, recording a log entry specifying a first logical storage element specified by the first received write operation. Completing activation of the first snapshot may include incrementing a snapshot value of the first logical storage unit from a previous snapshot value of the first logical storage unit, where the log entry specifies a first snapshot value of the first logical storage element at a time at which the first received write operation was received, where determining whether there are one or more logged write operations that require updating the snapshot may include comparing a first snapshot value of the logical storage element to the previous snapshot value of the first logical storage unit, and wherein, if the first snapshot value is less than the previous snapshot value, the first received write operation requires updating the snapshot.

BRIEF DESCRIPTION OF THE DRAWINGS

Features and advantages of the present invention will become more apparent from the following detailed description of illustrative embodiments thereof taken in conjunction with the accompanying drawings in which:

FIG. 4 a block diagram illustrating an example of a table used for a thin logical device, according to embodiments of the invention;

FIG. 5 is a block diagram illustrating an example of a data structure for mapping logical storage unit tracks to cache slots, according to embodiments of the invention;

FIG. 7 is a diagram illustrating an example of a data pool, according to embodiments of the invention;

FIG. 8 is a diagram illustrating an example of a snapshot table, according to embodiments of the invention;

FIG. 9 is a diagram s illustrating an example of a sequence number pointer table, according to embodiments of the invention;

FIG. 10 is a flow diagram illustrating processing performed in connection with initiating a targetless snapshot, according to embodiments of the invention;

DETAILED DESCRIPTION OF EMBODIMENTS

Figure 1:
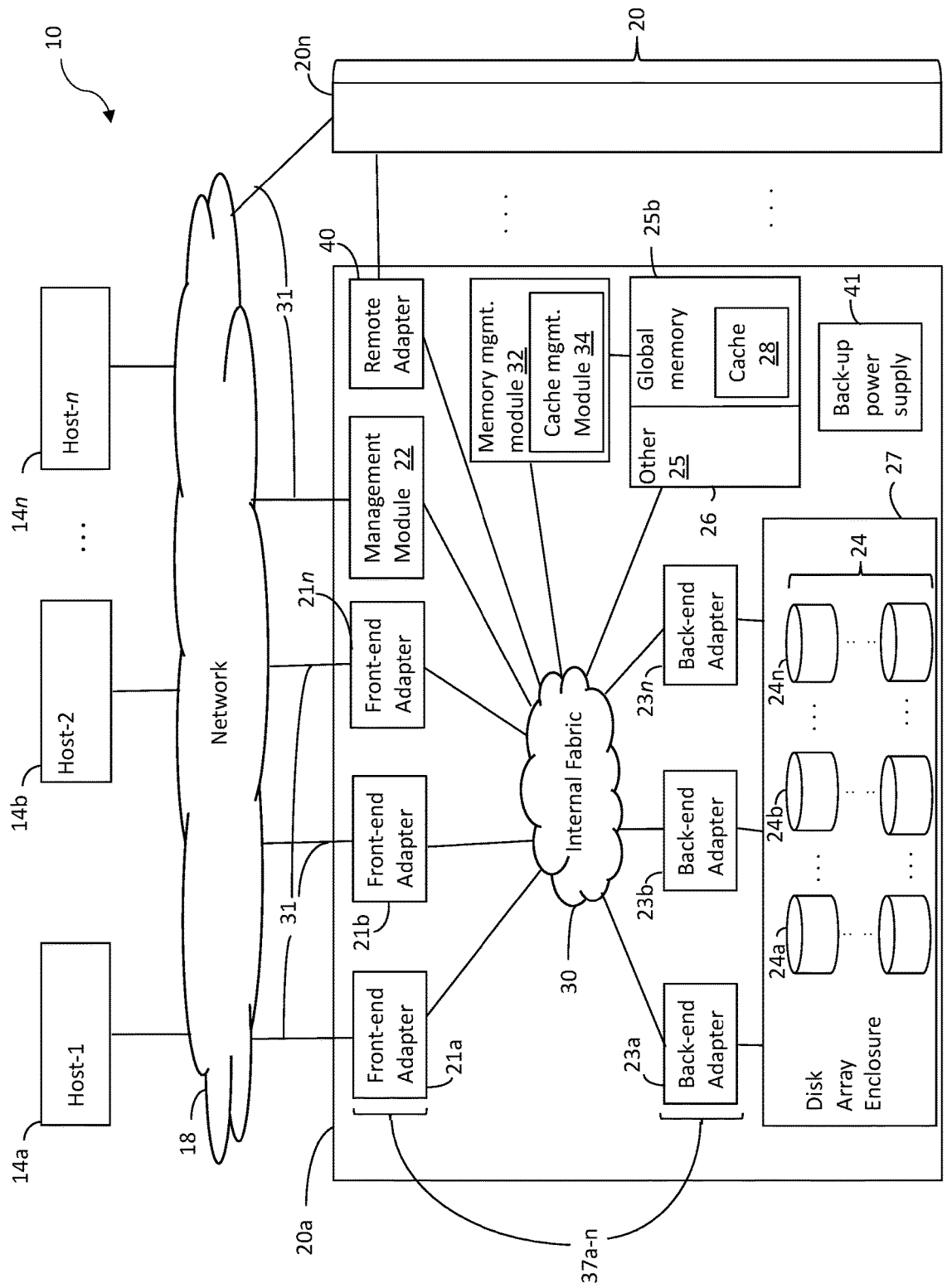
FIG. 1 is a block diagram illustrating an example of a data storage network, according to embodiments of the invention.

Snapshots are used on storage systems today to perform local replication (i.e., to another location on a same storage system) of an LSU, where a snapshot defines a point-in-time image of an LSU; i.e., the state of an LSU at the point in time. There are several known techniques for implementing snapshots, including those described in U.S. Pat. No. 7,340,489 to Vishlitzky, et al. titled "Virtual Storage Devices," issued Mar. 4, 2008, U.S. Pat. No. 9,965,216 to Jaganathan et al., titled "Targetless Snapshots," issued May 8, 2018 ("Jaganathan"), and U.S. patent application Ser. No. 16/885,702 to Tobin et al., titled "Snapshot Metadata Deduplication," filed May 28, 2020 ("Tobin"), the entire contents of each of which is hereby incorporated by reference.

On some storage systems, when an instruction is received to activate snapshots for one or more LSUs of the storage system, write operations from hosts may be held until the snapshots are activated, so that crash-consistent snapshots are created. As used herein, "activating a snapshot" (or synonymously "taking a snapshot") means updating snapshot metadata for an LSU so that a latest snapshot reflects the state of an LSU (e.g., R1) at the current point in time (i.e., the point in time the snapshot is taken). It should be appreciated that a snapshot may be created prior to being taken/activated in that that basic parameters (e.g., an ID, a sequence number) of the snapshot may be defined, for example, as described in Jaganathan, before the snapshot is taken. For example, on Symmetrix™, VMAX™, VMAX3™ or PowerMax™ systems made available from EMC Corporation of Hopkinton, Mass. ("Dell EMC"), when an instruction is received to activate snapshots of LSUs, an Enginuity Consistency Assist (ECA) window may be opened, which holds host write operations until the snapshots are activated.

A potential drawback of holding write operations during activation of snapshots is the delay in processing the write operations. That is, activation of a single snapshot is not instantaneous, as it requires updating certain snapshot metadata. This delay is proportional to the number of LSU for which snapshots are being activated, which can be on the order of tens of thousands, hundreds of thousands, or even more, which may cause delays on the order of hundreds of milliseconds, seconds or even more.

What may be desirable is a way to produce crash-consistent snapshots with reduced write delay.

Described herein are techniques and mechanisms for producing snapshots that do not require holding all write operations while snapshots are being activated. In some embodiments, rather than holding all write operations (e.g., by opening an ECA window) until snapshots are activated, write operations are allowed to proceed being performed. Snapshot write processing may be temporarily suspended while the snapshots are being activated, including updating snapshot metadata, while write operations received while the snapshots are being activated are logged.

After snapshots have been activated for all LSUs for which snapshots were instructed to be produced, the logging of write operations may be stopped, and the logged write operations processed to determine whether any of the logged write operations require updating snapshot information of any logical storage elements (LSEs) (e.g., extents) of the LSUs. While the logged write operations are being processed, any write operations received from a host for an LSE having a logged write operation may be held until the held operation, or all held operations, are processed. The number of write operations that may be held for this reason will be less than the number of write operations that would be held if write operations were held while snapshots were being activated.

As used herein, "snapshot information" of a snapshot includes snapshot metadata, and may include snapshot data. As used herein, "snapshot data" is data that is persisted (e.g., stored) exclusively for use by snapshots to reflect the state of LSUs at the different points in time represented by the snapshots. For example, in some snapshot technologies, such as those described in Jaganathan and Tobin, current LSU data may be shared by a snapshot of the LSU initially, at the time at which the snapshot is taken. That is, after a snapshot is taken, but before any write operations to any LSEs of the LSU following the snapshot are taken, the snapshot metadata points, directly or indirectly, to the same data pointed to by the LSU metadata representing the current state of the LSU. It is only after a first write to an LSE of the LSU following the taking of the snapshot that the snapshot data and the LSU data may diverge, resulting in the moving of the old data for the LSE to a new location (e.g., allocated from a pool of storage reserved for snapshots), and an updating of the snapshot metadata to point, directly or indirectly, to the data at the new location. This old data pointed-to by the snapshot metadata is now snapshot data that is exclusively used for snapshots, as opposed to the new data of the write operation, the location of which is now pointed to by current LSU metadata for the LSE, and also may be shared by future snapshots. Examples of data structures for storing LSU metadata are described in more detail herein.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14*a-n*; network 18; one or more storage systems 20*a-n*; other components; or any suitable combination of the foregoing. Storage systems 20*a-n*, connected to host systems 14*a-n* through network 18, may collectively constitute a distributed storage system 20. All of the host computers 14*a-n* and storage systems 20*a-n* may be located at the same physical site, or, alternatively, two or more host computers 14*a-n* and/or storage systems 20*a-n* may be located at different physical locations. Storage network 10 or portions thereof (e.g., one or more storage systems 20*a-n* in combination with network 18) may be any of a variety of types of storage networks, such as, for example, a storage area network (SAN), e.g., of a data center. Embodiments of the invention are described herein in reference to storage system 20*a*, but it should be appreciated that such embodiments may be implemented using other discrete storage systems (e.g., storage system 20*n*), alone or in combination with storage system 20*a*.

The N hosts 14*a-n* may access the storage system 20*a*, for example, in performing input/output (I/O) operations or data requests, through network 18. For example, each of hosts 14*a-n* may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25*b*) and compute resources, for example, one or more processing cores (e.g., as part of a CPU) and/or a CPU complex for processing I/O operations, and that as described in more detail elsewhere herein. There may be any number of directors 37*a-n*, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20*a* also may include an internal switching fabric (i.e., internal fabric) 30, which may include one or more switches, that enables internal communications between components of the storage system 20*a*, for example, directors 37*a-n* (FAs 21*a-n*, BEs 23*a-n*, RA 40, management module 22) and memory 26, e.g., to perform I/O operations. One or more internal logical communication paths may exist between the directors and the memory 26, for example, over the internal fabric 30. For example, any of the directors 37*a-n* may use the internal fabric 30 to communicate with other directors to access any of physical storage devices 24; i.e., without having to use memory 26. In addition, one of the directors 37*a-n* may be able to broadcast a message to all of the other directors 37*a-n* over the internal fabric 30 at the same time. Each of the components of system 20*a* may be configured to communicate over internal fabric 30 in accordance with one or more technologies such as, for example, InfiniBand (TB), Ethernet, Gen-Z, another technology, or any suitable combination of the foregoing.

The GM portion 25*b* may be used to facilitate data transfers and other communications between the directors 37*a-n* in a storage system. In one embodiment, the directors 37*a-n* (e.g., serving as FAs or BEs) may perform data operations using a cache 28 that may be included in the GM 25*b*, for example, in communications with other directors, and other components of the system 20*a*. The other portion 25*a* is that portion of memory that may be used in connection with other designations that may vary in accordance with each embodiment. Global memory 25*b* and cache 28 are described in more detail elsewhere herein. It should be appreciated that, although memory 26 is illustrated in FIG. 1 as being a single, discrete component of storage system 20*a*, the invention is not so limited. In some embodiments, memory 26, or the GM 25*b* or other memory 25*a* thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14*a-n*) may be notified that the write operation has completed. At a later time, the write data may be de-staged from cache 28 to one or more physical storage devices 24*a-n*, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20*a* to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20*a* may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20*a* (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20*a* may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
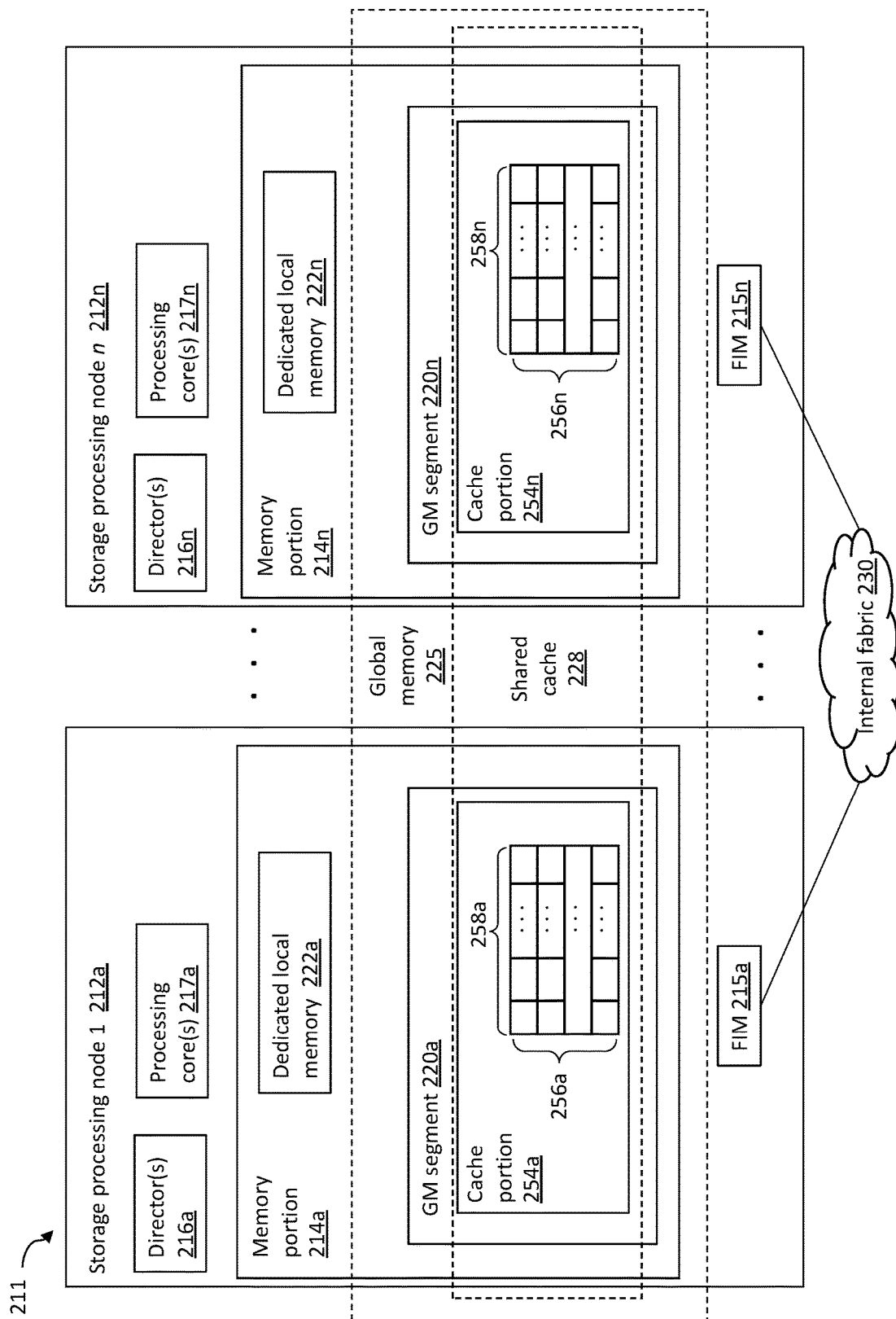
FIG. 2 is a block diagram illustrating an example of a storage system including multiple physically discrete storage processing nodes, according to embodiments of the invention.

Any of storage systems 20*a-n*, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
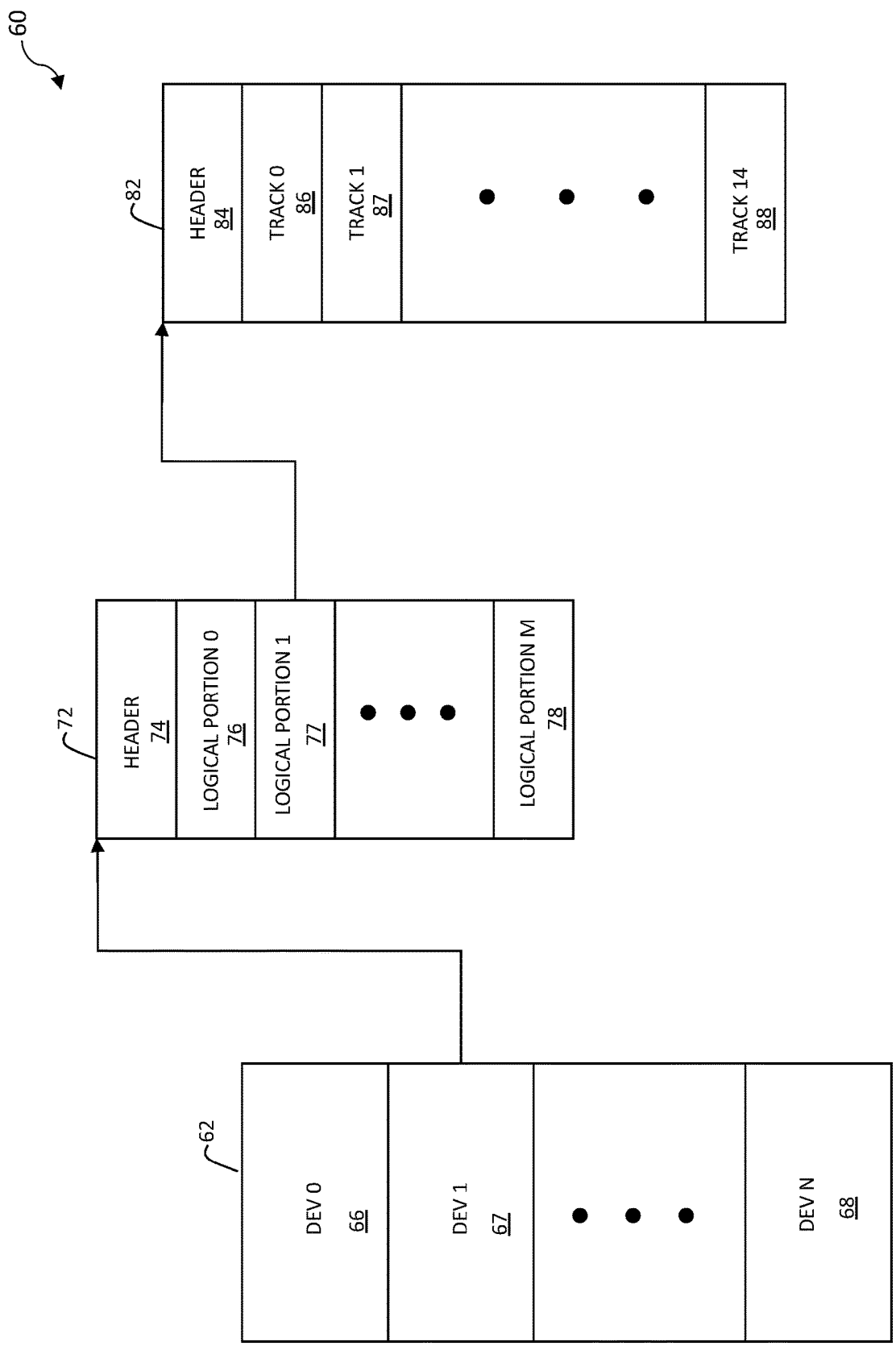
FIG. 3 is a block diagram illustrating an example of tables defining relationships between logical storage units and physical storage devices on a data storage system, according to embodiments of the invention.

FIG. 3 is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache. In some embodiments, each entry 86-88 may specify a version of the data stored on the track. A sub-element of an LSU, for example, a logical data portion or track, may be referred to herein as a logical storage element (LSE).

FIG. 4 is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the logical data portion maintains the null pointer that was written at initialization.

FIG. 5 is a block diagram illustrating an example of a data structure 300 for mapping LSU tracks (e.g., thin device tracks) to cache slots of a cache. Data structure 300 may be referred to herein as a "cache slot table." The cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of the cache slot table 300, a column 312 may specify (e.g., using a cache slot ID and/or memory address) a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

Each of the entries 302 of the cache slot table also may specify: cache lock information in a column 314, replication information in a column 316, and other cache information in a column 318. The cache lock information may indicate whether or not the cache slot represented by the entry is locked, and if locked, the process ID of the entity that owns the lock. The entity may be, for example: an FA executing a write operation from a host; an RA replicating a write operation from the cache slot to R2, or replicating a write operation from R2 into the cache slot; or a BE de-staging data in the cache to a physical storage device or reading data from a PSD into the cache slot. The replication information may specify information relative to replication, for example, the replication cycle number currently associated with the cache slot, the replication (e.g., RDF) group associated with the cache slot (i.e., associated with the R1 track currently mapped to the cache slot, a type of cache slot (e.g., normal or duplicate), and other information. A normal cache slot type may indicate that a cache slot is handled per normal processing, i.e., when there is not a cache lock conflict resolution involved, for example, as described herein. A duplicate cache slot type may indicate that a cache slot is a duplicate of a cache slot used to resolve a cache slot lock conflict, which is not handled in the standard manner, but rather, is handled differently to resolve the cache slot lock, for example, as described herein.

The other cache slot information in the column 318 may include information about the status of writes to one or more portions (e.g., sectors) of the R1 track corresponding to the cache slot, e.g., whether the write is pending or complete. Completing the write may include writing it to a PSD on A1 (e.g., de-staging it from cache) and receiving acknowledgement from A2 (and perhaps other remote storage systems to which the LSU in question is being replicated) that the replicated data is committed on A2 (and other remote storage systems if any).

It should be appreciated that the cache slot table 300 may be used for purposes independent of any LSU tracks mapped thereto. That is, a cache slot ID or memory address in cache pointer column 312 may be used as a key to access, and modify as necessary, cache metadata about a cache slot, including any of the information in columns 314, 316 and/or 318.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21*a-n*. In addition, RA 40 and/or the BEs 23*a-n* also may use and locally store portions of the tables 62, 72, 72', 82 and 300. Other data structures may be stored in any of GM 25*b*, memory 25*a*, GM segment 220*a-n* and/or dedicated local memories 22*a-n*.

Any of the information contained in any of the data structures 62, 72, 72', 82 and 300, for example, the information included in the LSU track table 82 and the cache slot table 300, may be combined in a single data structure, which may be referred to herein as an LSU track metadata table. In some embodiments, a cache slot table 300 may be maintained separately from an LSU track metadata table. In such embodiments, the entries 302 of the cache slot table 300 may be indexed/keyed by a cache slot ID and/or memory address in the column 312, may identify the LSU track currently mapped to the slot (if any) in columns 304 and 306, may include cache lock info in the column 314, and may include other cache info. In such embodiments, the LSU track table may include: information about the LSU track described in relation to the LSU track table 82; replication information described in relation to the column 316; the cache slot (of any) currently mapped to the LSU track; and any other information described in relation to the cache slot table 300.

Embodiments of the invention may employ snapshot techniques, for example, as will now be described.

Figure 6A:
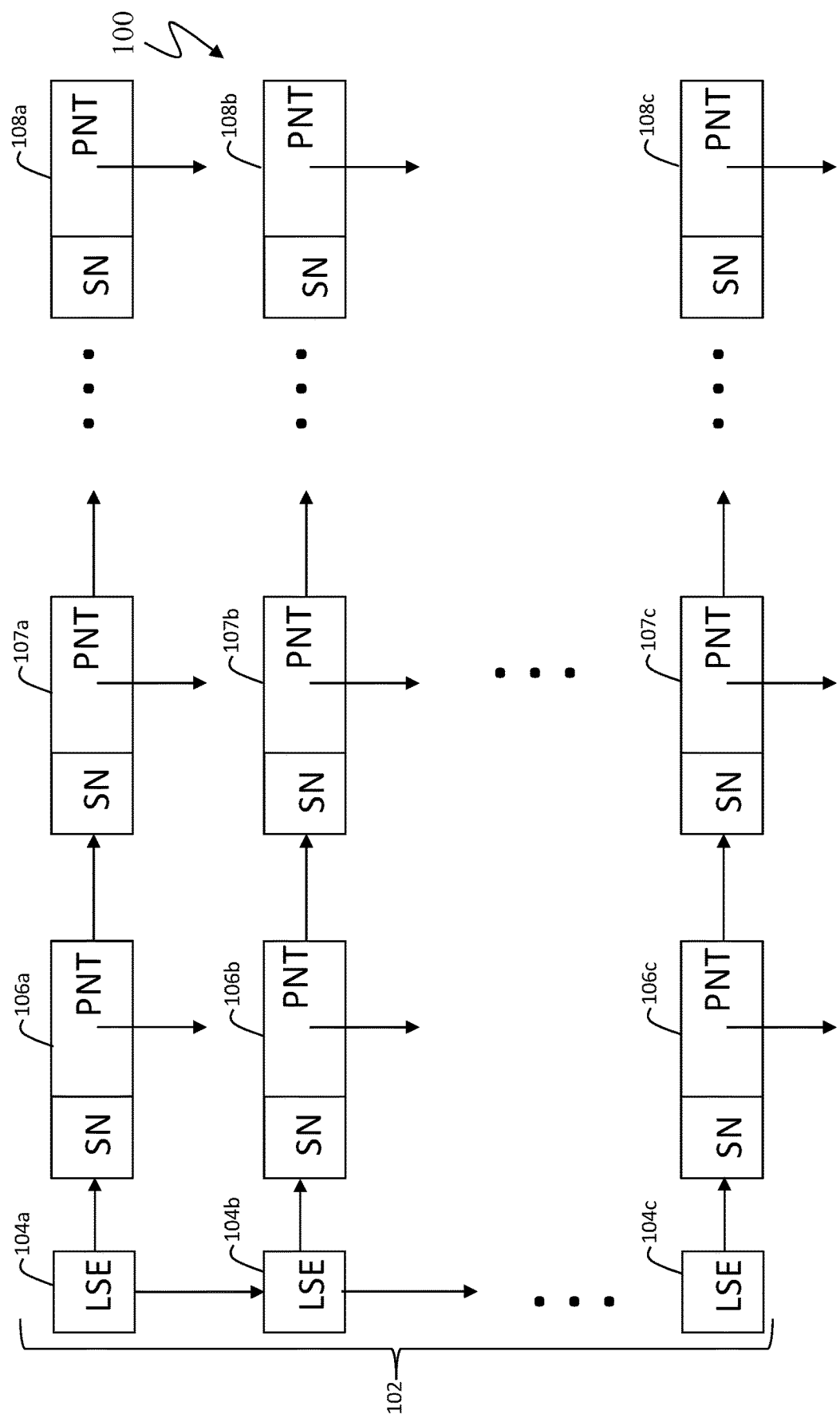
FIG. 6A is a diagram illustrating an example of a replication data pointer table, according to embodiments of the invention.

Referring to FIG. 6A, a replication data pointers (RDP) table 100 includes a first linked list 102 of a plurality of logical storage element (LSE) numbers 104*a*-104*c*, according to embodiments of the invention. A logical storage element or LSE may be any logically defined portion of an LSU, including any of: a logical data unit (as defined elsewhere herein), a track (as defined elsewhere herein), an extent or other type of portion. The RDP table 100 may be used to maintain data that is moved in connection with providing targetless snapshots, as described herein. Each of the LSE numbers 104*a*-104*c* may correspond to an LSE of an LSU. The LSU may be, for example, a conventional logical device with all of the LSEs having corresponding physical data storage allocated thereto or may be a thin device, as described in more detail elsewhere herein.

Each of the LSE numbers 104*a*-104*c* may correspond to one or more table entries that are maintained using an appropriate data structure, such as a linked list. The LSE number 104*a* may correspond to a plurality of table entries 106*a*-108*a*, the LSE number 104*b* may correspond to a plurality of table entries 106*b*-108*b*, and the LSE number 104*c* may correspond to a plurality of table entries 106*c*-108*c*. Note that, although the table 100 is illustrated with three LSE numbers 104*a*-104*c* each having three table entries, the table 100 may contain any number of LSE numbers each having any number of table entries. In some cases, which will become apparent from the additional discussion herein, it is possible for there to be no LSE number or corresponding table entries associated with a particular LSE of an LSU. Each of the table entries 106a-108c may include a sequence number and a pointer to storage, which are explained in more detail elsewhere herein.

Figure 6B:
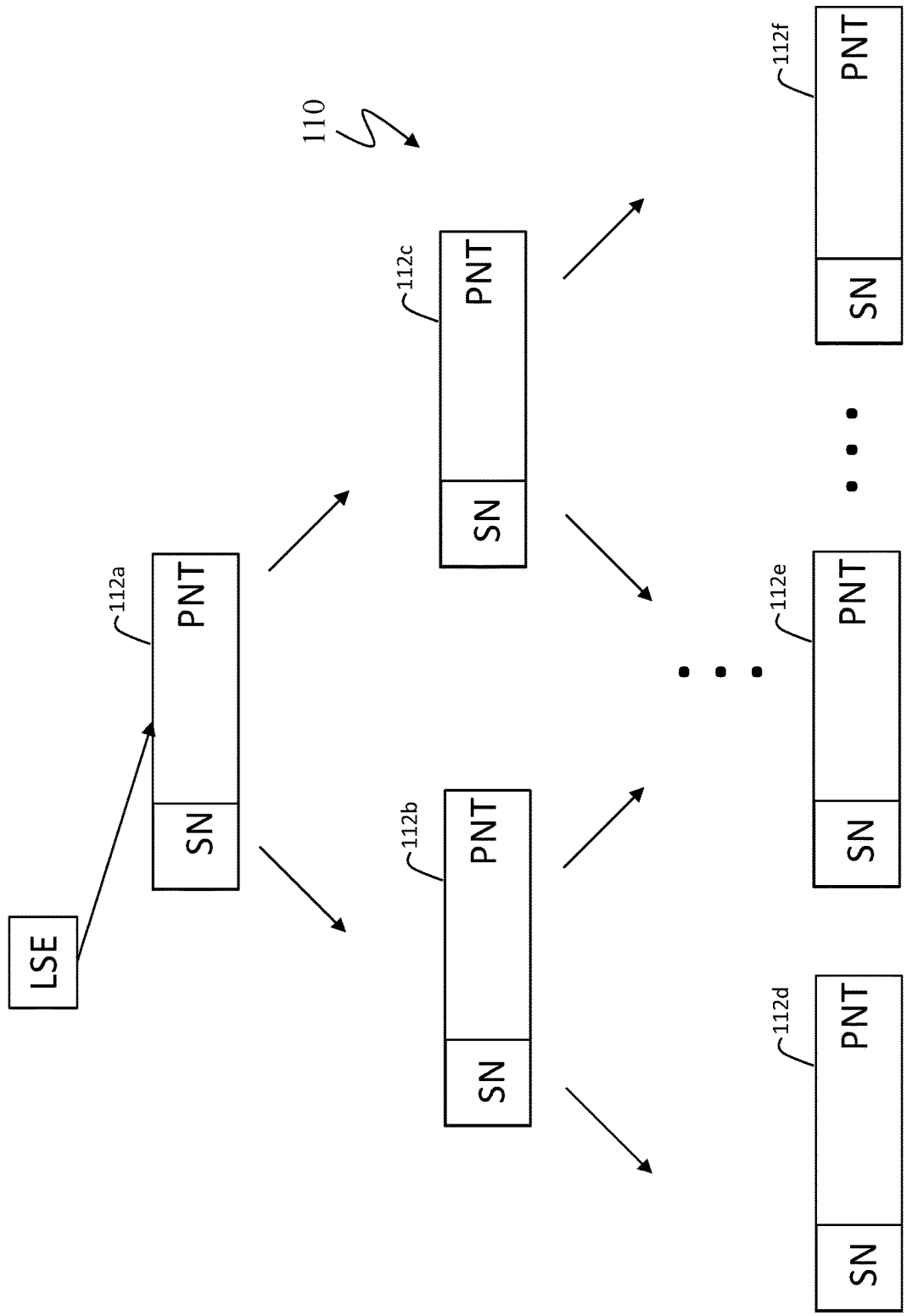
FIG. 6B is a diagram illustrating an example of a replication data pointer tree, according to embodiments of the invention.

Referring to FIG. 6B, a replication data pointers (RDP) tree 110 may include a plurality of table entries 112a-112f that each correspond to a particular LSE, according to embodiments of the invention. Each of the table entries 112a-112f may include a sequence number and a pointer to storage. The RDP tree 110 may correspond to one of the linked lists pointed to by one of the data pointers 104a-104c of the RDP table 100, discussed above. The sequence number and the pointer to storage may be similar to the sequence number and pointer to storage used in connection with the RDP table 100, and are described in more detail elsewhere herein. In an embodiment herein, the RDP tree 110 is a balanced binary tree ordered according to sequence number.

Referring to FIG. 7, a data pool 115 may include storage for data that is moved in connection with maintaining targetless snapshots, according to embodiments of the invention. Data stored in the data pool 115 may be pointed to by the pointers provided with the table entries 106a-108c or the table entries 112a-112f In some embodiments, the data pool 115 is provided in a single logical and/or physical location. In other embodiments, the data pool 115 may be distributed and/or may use more than one physical and/or logical data storage element. Providing data to the data pool 115 is discussed in more detail elsewhere herein.

Referring to FIG. 8, a snapshot table 120 may include a plurality of entries corresponding to particular snapshots, according to embodiments of the invention. Each of the entries may include a snapshot ID and a sequence number. The snapshot ID may be used to identify a particular snapshot and could be text (e.g., "Mar. 12, 2014, 8:00 am snapshot") or could be a token that is used by other software (not shown herein) to identify each of the snapshots. The sequence number provided with each of the snapshots may be used in connection with providing targetless snapshots and is described in more detail elsewhere herein.

Referring to FIG. 9, a sequence number table 130 is shown as having a plurality of entries, according to embodiments of the invention. Each of the entries of the table 130 may contain a sequence number, as described in more detail elsewhere herein. The table 130 may contain a single entry for each LSE number (or other appropriate data increment) of the LSU (e.g., logical device or thin device) for which targetless snapshots are being provided. Thus, for example, if there are one hundred LSEs in an LSU, there may be one hundred entries for sequence numbers in the table 130. Use of the sequence number table 130 and of sequence numbers is described in more detail elsewhere herein.

FIG. 10 is a flowchart illustrating an example of a method 1100 of performing operations in connection with performing targetless snapshots for a LSU, according to embodiments of the invention. In a step 1102, a global sequence number (associated with the LSU for which targetless snapshots are being provided) and the tables 100, 120, 130 that are used with targetless snapshots may be initialized. Note that the RDP tree 110 may be used in addition to or instead of the RDP table 100. In an embodiment herein, snapshot sequence numbers start at zero and are incremented by one for each snapshot, but of course in other instances it is possible to start at any number and increment or decrement by any amount. At the step 1102, the RDP table 100 (and/or the RDP tree 110) may be initialized to be empty (contain no entries), the snapshot table 120 may be initialized to be empty, the sequence number table 130 may be initialized so that each entry contains zero (the initial sequence number), and the global sequence number may be initialized to zero (the initial sequence number).

Following the step 1102 may be a step 1104 where the system waits for a snapshot to occur. A snapshot may be user initiated or may be automated to occur at specific times (e.g., every hour). Once a snapshot occurs, control may transfer from the step 1104 to a step 1106 where an entry corresponding to the snapshot may be created in the snapshot table 120. At the step 1106, the ID value may be provided to the new entry in the snapshot table 120 and the corresponding sequence number may be set to one greater than the current global sequence number. The ID value may include a user specified name that is to be associated with the sequence number provided to the entry. Following the step 1106 may be a step 1108 where the global sequence number is incremented. Following the step 1108, control may transfer back to the step 1104 to wait for the next snapshot to occur.

Figures 11, 12:
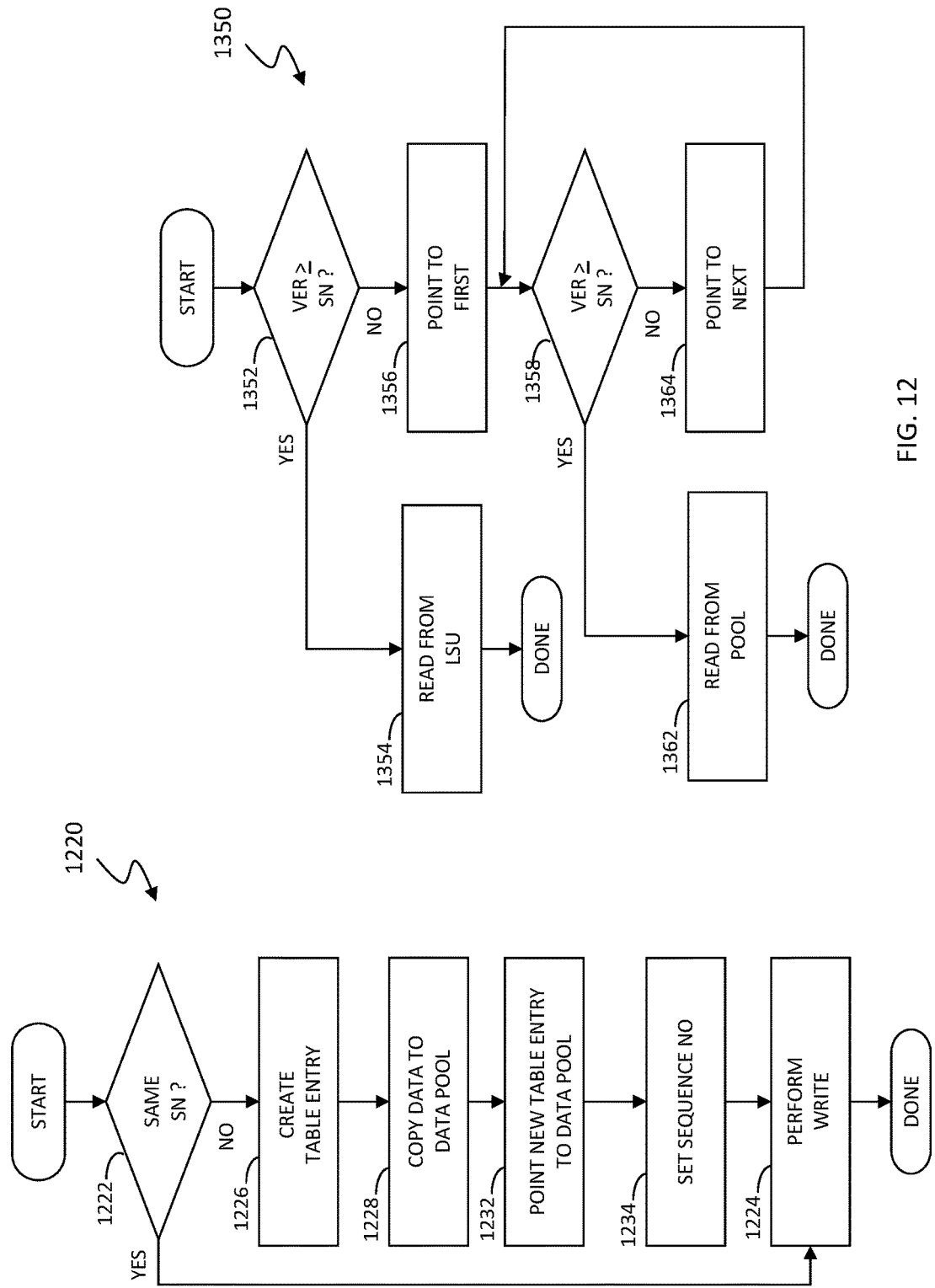
FIG. 11 is a flow diagram illustrating processing performed in connection with a write to a logical device after initiating a targetless snapshot, according to embodiments of the invention.
FIG. 12 is a flow diagram illustrating processing performed in connection with a read operation after initiating a targetless snapshot, according to embodiments of the invention.

FIG. 11 is a flowchart illustrating an example of a method 1220 performed in connection with a write operation to a LSU for which snapshots are being provided, according to embodiments of the invention. In a test step 1222, it may be determined if the global sequence number equals the sequence number associated with the LSE to which the write is being provided, which may be provided by the sequence number table 130. If so, then control may transfer from the test step 1222 to a step 1224 where the write operation may be performed in a usual fashion. No special processing may be performed in this case because the global sequence number being equal to the sequence number where the data is being written means that any snapshot data associated with that particular data section has already been protected (copied to the data pool 115, as described in more detail elsewhere herein). Following the step 1224, processing may be complete.

If it is determined in the step 1222 that the global sequence number does not equal the sequence number associated with the LSE to which the write is being performed (the global sequence number is greater), then control may transfer from the step 1222 to a step 1226 where an entry in the RDP table 100 may be created by placing the new entry in a linked list using the LSE number where the write is being performed on the LSU and using the sequence number for the source LSE (from the sequence number table 130). If the RDP tree 110 is used, then in the step 1226 a new entry may be created for the RDP tree 110. Following the step 1226 may be a step 1228 where data that is being overwritten is copied from the LSU to the data pool 115. Note that the step 1228 may be omitted in instances where the LSU is a thin device and the particular LSE is empty (e.g., the pointer for the LSE points to null). Note also that, in some cases data on the LSU may be cached, in which case the copy may be from the cache memory.

Following the step 1228 is a step 1232 where the pointer in the table entry created at the step 1226, described above, may be set to point to the data in the data pool 115 that was copied at the step 1228, described above, or to null in the case of a thin logical device with no data in the LSE. Following the step 1232 is a step 1234 where the sequence number for the entry in the sequence number table 130 may be set to the global sequence number, indicating that the corresponding data written to the LSU corresponds to the current global sequence number. Following the step 1234 may be the step 1224, discussed above, where the write operation to write the new data to the device may be performed. Following the step 1224, processing may be complete.

FIG. 12 is a flowchart illustrating an example of a method 1350 of processing performed in connection with reading different versions from different snapshots of data on the LSU, according to embodiments of the invention. In a step 1352, it may be determined if a sequence number associated with a desired version (VER in flow diagram 1350) is greater than or equal to a version number from the sequence number table (SNT in the flow diagram 1350). For example, if it was desired to read a version of data associated with a particular snapshot (e.g., "8:00 am on Mar. 12, 2014") having a sequence number X, then the test at the step 1352 may compare X with an entry in the sequence number table for the LSE of interest containing data being read, which may be provided in the sequence number table 130. If it is determined in the step 1352 that the sequence number of the desired version is greater than or equal to a version number from the sequence number table corresponding to the data being read, then data on the LSU was written prior to the time of the snapshot, and control may transfer from the step 1352 to the step 1354 where the data is read from the LSU. Note that this also may occur when it is desired to read current data from the LSU since data on the logical volume should always be the latest version. Following the step 1354, processing may be complete.

If it is determined at the step 1352 that the sequence number of the desired version is not greater than or equal to a version number from the sequence number table corresponding to the data being read, then data on the LSU was written after the time of the snapshot and the desired data is in the data pool 115, and control may transfer from the step 1352 to a step 1356 where an iteration pointer may be set to point to a first item in a list of items in the RDP table 100. The iteration pointer may be used to traverse a list of pointers for a LSE corresponding to the data being read. For the explanation herein, it may be assumed that the list of pointers is arranged with the most recently added table entry (having the highest sequence number) being first in the list, followed by the next most recently added table entry (having the second highest sequence number), etc. Generally, the iteration pointer may iterate through table entries for a specific LSE from highest sequence number to lowest sequence number. Note that, in instances where the RDP tree 110 is used, the iteration pointer may be set to point to the top of the RDP tree 110 and is used to traverse the RDP tree 110.

Following the step 1356 may be a test step 1358 where it may be determined if a sequence number associated with the desired version is greater than or equal to a version number associated with the table or tree entry indicated by the iteration pointer, similar to the test at the step 1352, discussed above. If so, then control may transfer from the test step 1358 to a step 1362 where data may be read from the data pool 115 according to the data pointer of the RDP table or RDP tree entry indicated by the iteration pointer. Following the step 1362, processing may be complete. Otherwise, if it is determined at the step 1358 that the sequence number associated with the desired version is not greater than or equal to the version number associated with the table or tree entry indicated by the iteration pointer, then control may transfer from the step 1358 to a step 1364 where the iteration pointer is set to point to a next table or tree entry. Note that the final item of the table or tree entries may have a sequence number of zero so that, eventually, the test at the step 1358 will cause the step 1362 to be executed.

In some embodiments of the invention, snapshots may be taken on a storage system without holding all write operations while snapshots are being activated. In response to an instruction to activate snapshots for one or more LSUs, write operations may not be held. Rather, write operations may continue being processed, for example, written to cache and de-staged to a PSD. However, the snapshot write processing may be suspended, and write operations may start being logged, for example, until the activation of all of the LSUs is complete. In such embodiments, the write operations may be logged in an outstanding write log (OWL), where the snapshot processing of these write operations may remain outstanding for a period of time following the activation of LSUs.

Figure 13:
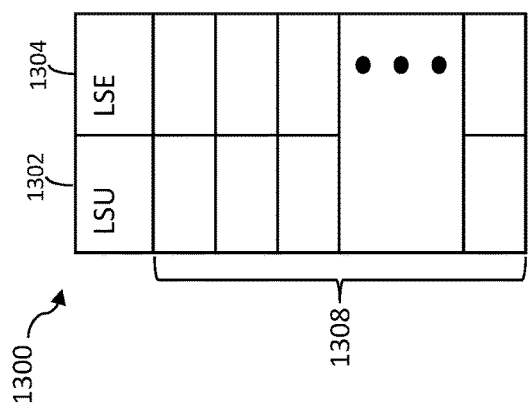
FIG. 13 is a block diagram of an outstanding write log, according to embodiments of the invention.

FIG. 13 is a block diagram of an OWL 1300, according to embodiments of the invention. Other embodiments of an OWL, for example, variations of the OWL 1300, are possible and are intended to fall within the scope of the invention. The OWL 1300 may include a plurality of entries 1308, where each entry represents a write operation that was received while the snapshots are being activated. Each entry may specify the LSU (e.g., logical device) and LSE (e.g., represented LBA range) specified by the write operation, for example, in columns 1302 and 1304, respectively. The entries 1308 may be listed in an order in which the write operations they represent were received, and, as described in more detail elsewhere herein, may be processed in the order in which they were received; i.e., in a first-in-first-out (FIFO) order.

For reasons that should be clear from other descriptions elsewhere herein, it may be desirable to know which LSUs and/or which LSEs of which LSUs have entries (representing outstanding write operations) in the OWL 1300. For this reason, an outstanding write counter (OWC) for LSUs and/or an outstanding write counter (OWC) for LSEs may be provided.

Figure 14:
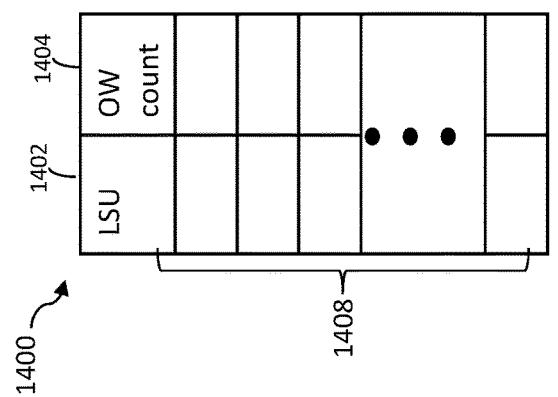
FIG. 14 is a block diagram of an outstanding write counter for logical storage units, according to embodiments of the invention.

FIG. 14 is a block diagram of an LSU OWC 1400, according to embodiments of the invention. Other embodiments of an LSU OWC, for example, variations of the LSU OWC 1400, are possible and are intended to fall within the scope of the invention. The LSU OWC 1400 may include a plurality of entries 1408, where each entry represents an LSU. In some embodiments, the LSU OWC 1400 may include entries only for LSUs having at least one LSE having at least one outstanding write in the OWL 1300, in which case the LSU OWC 1400 may be deemed densely populated. In other embodiments, the LSU OWC 1400 may include an entry for each LSU on a storage system, regardless of whether an LSU has at least one LSE having at least one outstanding write in the OWL 1300, in which case the LSU OWC 1400 may be deemed sparsely populated. For each entry, for the LSU represented by the entry, an LSU ID and a count of outstanding writes for LSEs of the LSU in the OWL 1300 may be specified in columns 1402 and 1404, respectively. This count may be incremented each time an outstanding write operation for an LSE of the LSU is added to the OWL 1300, and decremented each time an outstanding write for an LSE of the LSU is processed and removed from the OWL 1300. For a sparsely populated LSU OWC 1400, a zero value may be used for any LSU not having any entries in the OWL 1300. For a densely populated LSU OWC, an entry may not be added for an LSU until an entry for an LSE of the LSU is added to the OWL 1300, and an entry for an LSU may be removed from the LSU OWC 1400 when a last remaining entry for an LSE of the LSU is removed from the OWL 1300.

Figure 15:
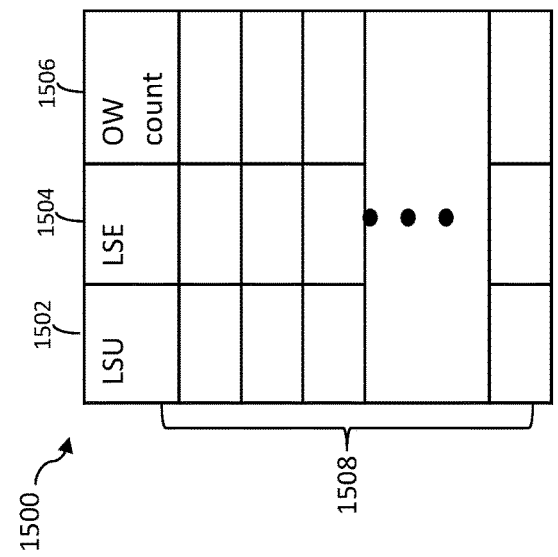
FIG. 15 is a block diagram of an outstanding write counter for logical storage elements of a logical storage unit, according to embodiments of the invention.

FIG. 15 is a block diagram of an LSE OWC 1500, according to embodiments of the invention. Other embodiments of an LSE OWC, for example, variations of the LSE OWC 1500, are possible and are intended to fall within the scope of the invention. The LSE OWC 1500 may include a plurality of entries 1508, where each entry represents an LSE of an LSU. In some embodiments, the LSE OWC 1500 may include entries only for LSEs having at least one outstanding write in the OWL 1300, in which case the LSE OWC 1500 may be deemed densely populated. In other embodiments, the LSE OWC 1500 may include an entry for each LSE on a storage system, regardless of whether an LSE has at least one outstanding write operation in the OWL 1300, in which case the LSE OWC 1500 may be deemed sparsely populated. For each entry, for the LSE represented by the entry, an LSU ID, and LSE ID and a count of outstanding writes for the LSEs in the OWL 1300 may be specified in columns 1502, 1504 and 1506, respectively. This count may be incremented each time an outstanding write for the LSE is added to the OWL 1300, and decremented each time an outstanding write for an LSE is processed and removed from the OWL 1300. For a sparsely populated LSE OWC 1500, a zero value may be used for any LSE not having any entries in the OWL 1300. For a densely populated LSE OWC, an entry may not be added for an LSE until an entry for the LSE is added to the OWL 1300, and an entry for an LSE may be removed from the LSE OWC 1500 when a last remaining entry for an LSE is removed from the OWL 1300.

The OWL 1300, LSU OWC 1400 and LSE OWC 1500 may be used in processing write operations while taking snapshots, as described in more detail herein. For each of the OWL 1300, LSU OWC 1400 and LSE OWC 1500, a data structure of another type may be used, for example, an object-oriented data structure, a linked list or a tree.

Figure 16:
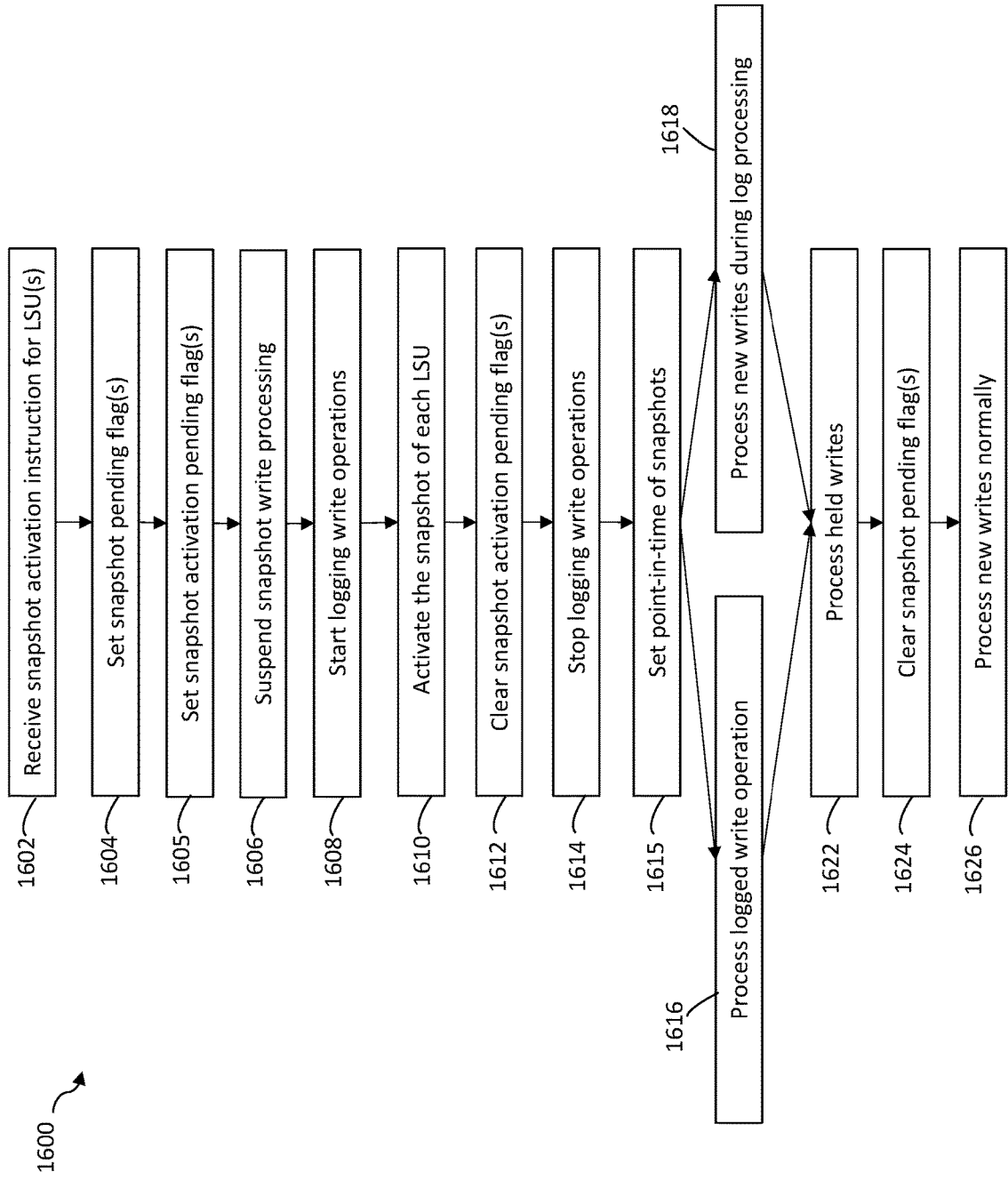
FIG. 16 is a flowchart of a method of producing snapshots, according to embodiments of the invention.

FIG. 16 is a flowchart of a method 1600 of producing snapshots, according to embodiments of the invention. Other embodiments of a method of producing snapshots, for example, variations of the method 1600, are possible and are intended to fall within the scope of the invention.

In a step 1602, a snapshot activation instruction for one or more LSU(s) may be received. For example, one or more snapshot groups may be defined including a plurality of LSUs, and an instruction may be received indicating to perform a snapshot for the snapshot group, i.e., for each LSU of the snapshot group.

In a step 1604, a snapshot pending flag may be set, either for each individual LSU specified in the instruction received in the step 1602, or globally for all such LSUs, where the flag indicates that the activation and updating of the snapshot(s) as described in more detail herein is in progress. While the snapshot pending flag is set, the processing of write operations, in particular, snapshot-related processing, may not be performed normally, but rather as described in more detail herein.

In a step 1605, a snapshot activation pending flag may be set, either for each individual LSU specified in the instruction received in the step 1602, or globally for all such LSUs, indicating that the activation of the snapshot(s) is in progress. That is, the overall processing of a snapshot as described herein may considered to have two primary phases or parts, the activation phase and the updating phase. In some embodiments, the snapshot pending flag set in the step 1604 may remain set throughout the snapshot processing, including both the activation phase and the updating phase, whereas the snapshot activation pending flag set in the step 1605 may remaining set for an LSU (or globally for all subject LSUs) only until the activation phase (e.g., including activating all the LSUs specified in the instruction received in the step 1602) is complete.

In a step 1606, snapshot write processing may be suspended for each of the LSUs specified in the instruction received in the step 1602, and may remain suspended, for each LSU, until the processing of the snapshot for the LSU is completed, as described in more detail herein. When not suspended, the snapshot write processing may be performed as described in relation to the method 1220 described in relation to FIG. 11.

In a step 1608, write operations may start to be logged, for example, in the OWL 1300, as described in more detail elsewhere herein. For example, entries for write operations may be stored in the OWL 1300 in the order in which the write operations are received, and may specify the LSU and the LSE of the write operation. The logging also may include incrementing LSU OWC 1400 and LSE OWC 1500, as described in more detail elsewhere herein.

In some embodiments, separate OWLs and counters, e.g., the OWLS 1300, LSU OWC 1400 and LSE OWC 1500, may be maintained on separate storage processing nodes (e.g., 212*a-n*), for example, separate director boards of a PowerMax, VMAX or Symmetric system. For example, to reduce time in populating OWLs and counters, each storage processing node 212*a-n* may populate its own OWL and counters in its dedicated local memory 222*a-n*, respectively, for the write operations the storage processing node receives from hosts while write operations are being logged. After the logging has stopped in a step 1614 and before processing the logged write operations in a step 1616, described in more detail herein, the multiple OWLs and counters then may be consolidated into one OWL, one LSU OWC and one LSE OWC, for example, in global memory 225 distributed across multiple storage processing nodes for processing by the multiple storage processing nodes.

In a step 1610, the snapshot of each LSU may be activated. Activation may include updating metadata for each LSU, which may vary depending on the snapshot technology used, including any of those described herein. For example, for target-based snapshots, the snapshot data for a source LSU may be copied to a target LSU. For a targetless snapshot technology, updating the metadata of an LSU may include updating an RDP table 100 and/or RDP tree 110 of the LSU, and incrementing a snapshot sequence number (e.g., global sequence number) of the LSU, e.g., by 1. It should be appreciated that the snapshot sequence number of each LSU may be different, as each LSU may have been created at different times and/or have snapshots created therefor at different times.

After each LSU has been activated in the step 1610, a global snapshot activation pending flag, or each individual snapshot activation pending flag, may be cleared in a step 1612 and the logging of write operations (e.g., in the OWL 1300) stopped in the step 1614.

The point in time reflected by the snapshots being activated may be set to the current time in a step 1615. It should be appreciated that all of the entries in the OWL should be for write operations that were received after the activation instruction in the step 1602 and before logging of write operations was stopped in the step 1614, and before the point-in-time represented by the snapshot. Thus, each logged write operation may be processed as if it occurred before the activation of the snapshots in the step 1610, e.g., before the snapshot sequence number (SN) of its LSU was incremented.

Accordingly, after the snapshots have been activated in the step 1610 and the logging of write operations stopped in the step 1614, the logged entries (e.g., in the OWL 1300) may be processed in the step 1616, as described in more detail elsewhere herein, to determine if any snapshot information needs to be updated to reflect that occurrence of one or more logged write operations before activation of the snapshot.

In some embodiments, to reduce the time it takes to process the logged entries, multiple processes may perform the step 1616 concurrently. For example, multiple directors 216*a-n* on storage processing nodes 212*a-n* may execute on their respective separate processing cores 217*a-n* to process the logged entries of an OWL residing in global memory 225 distributed across the multiple storage processing nodes 212*a-n*.

Concurrently to the logged write operations being processed, new write operation—i.e., write operations received after the logging has stopped—may be processed in a step 1618, for example, as described in more detail elsewhere herein. The processing of new write operations may result in one or more write operations being held, as described in more detail elsewhere herein.

After the processing of the logged writes in the step 1616 is completed—e.g., after all entries of the OWL 1300 have been processed—the held write operations resulting from the step 1618 may be processed in the step 1622, for example, in the order in which they were held (e.g., FIFO order). That is, each held write operation may be processed normally, including writing the data thereof to cache to be de-staged to a PSD, and performing snap write processing on the write operation.

After the held writes have been processed in the step 1622, the global snapshot pending flag, or individual snapshot pending flags, set in in the step 1604 may be cleared, after which write operations may be processed normally in a step 1626, including writing the data thereof to cache to be de-staged to a PSD, and performing snap write processing on the write operation. That is, write operations received after the step 1624 may not be logged or processed any differently, for example, not processed as described in relation to the step 1618.

Figure 17:
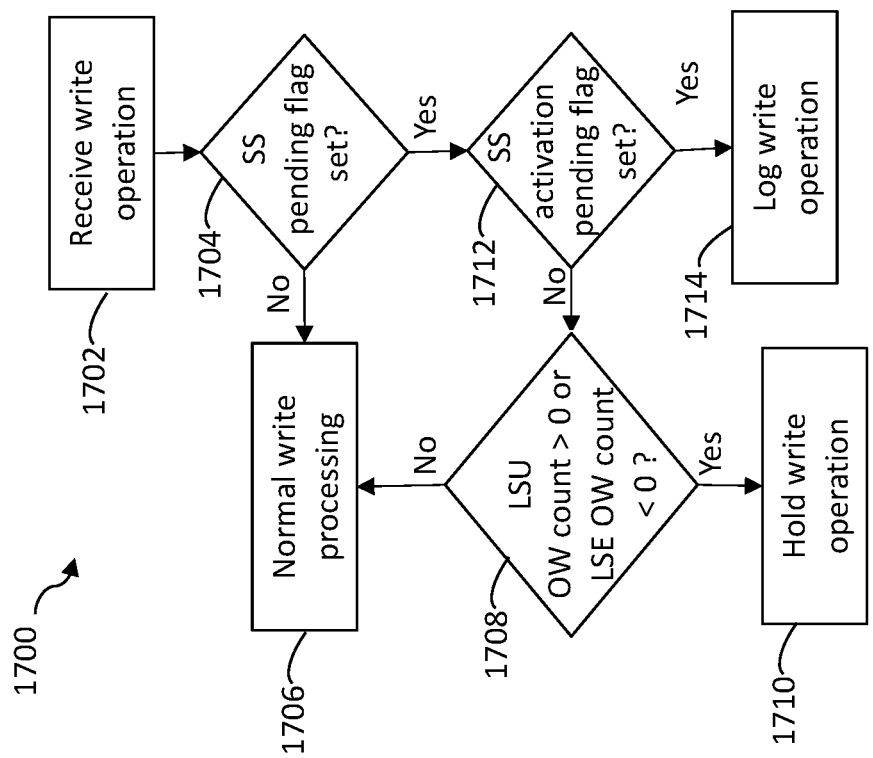
FIG. 17 is a flowchart of a method of processing write operations while snapshots are being produced, according to embodiments of the invention.

FIG. 17 is a flowchart of a method 1700 of processing write operations received while snapshots are being produced, according to embodiments of the invention. Other embodiments of a method of processing write operations received while snapshots are being produced, for example, variations of the method 1700, are possible and are intended to fall within the scope of the invention.

In a step 1702, a write operation may be received for an LSE of an LSU from a host system. In a step 1704, it may be determined whether a snapshot pending flag—e.g., a global flag for all LSUs for which snapshots are being produced or a snapshot pending flag for the LSU of the write operation—is set, e.g., per step 1604. If the flag is not set—meaning there is not a producing of a snapshot of the LSU in progress—normal write processing may be performed on the write operation in a step 1706.

If it is determined in a step 1704 that a snapshot pending flag is set—meaning there is a producing of a snapshot of the LSU in progress, in step 1712 it may be determined whether a snapshot activation pending flag—e.g., a global flag for all LSUs for which snapshot are being produced or a snapshot activation pending flag for the LSU of the write operation—is set. If the flag is set—meaning that the snapshot process is in the activation phase, then the write operation may be logged in a step 1714. For example, the LSU and LSE of the write operation may be stored in a next entry of the OWL 1300. Further, snapshot write processing may not be performed because the SS pending flag is set, but the normal writing of the data thereof to cache to be de-staged to a PSD may still be performed.

If it is determined in the step 1712 that the snapshot activation pending flag is not set, this means that the snapshot process is in the snapshot update phase, and in a step 1708, it may be determined whether there are any outstanding write operations for the LSU and/or LSE, for example by determining whether the LSU outstanding write count and/or LSE outstanding write count for the LSU and LSE of the write operation, respectively, are greater than zero. For example, in some embodiments, only an LSE outstanding write count is maintained, for example, in the LSE OWC 1500. In other embodiments, an LSU write count is maintained, for example, in the LSU OWC 1400, and the LSU outstanding write count may be checked before checking the LSE OWC 1500. If both counters are used, and both are zero, or if just the LSE OWC is used and it is zero, this means that there are no outstanding write operations for the LSE, and the current write may be processed normally in a step 1706—i.e., both the writes to cache and the snapshot write processing may be performed normally.

If both the LSU OWC and the LSE OWC are used, and either are non-zero, or if just the LSE OWC is used and it is non-zero, this means that there are outstanding write operations for the LSE, and the write operation is held.

Figure 18:
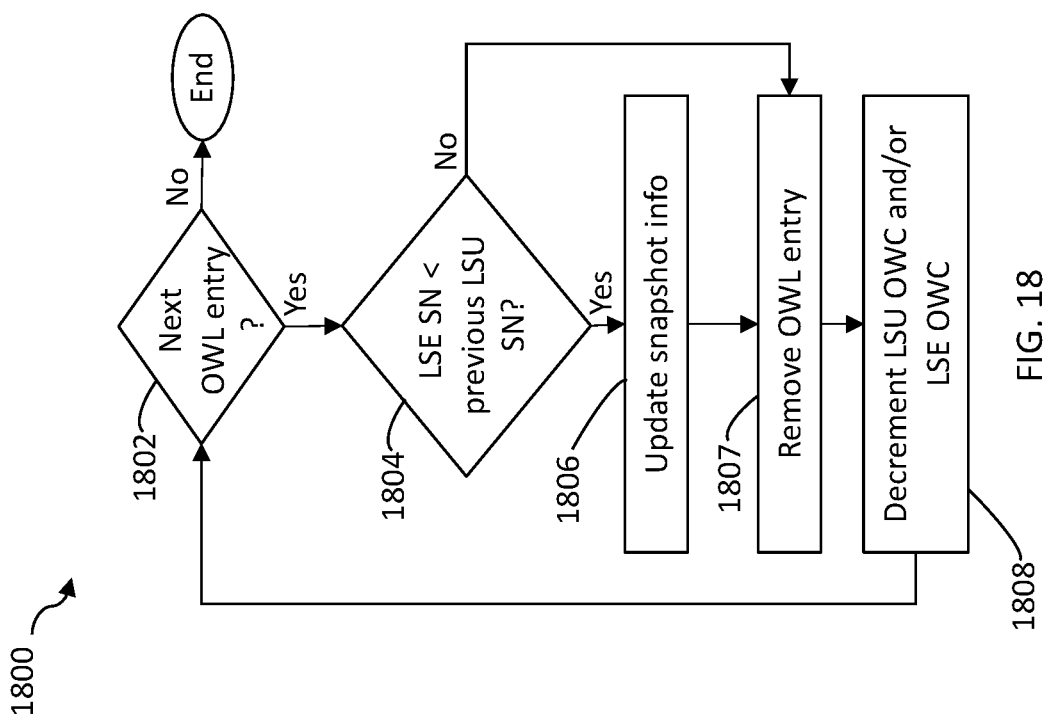
FIG. 18 is a flowchart of a method of processing an outstanding write log, according to embodiments of the invention.

FIG. 18 is a flowchart of a method 1800 of processing an OWL (e.g., OWL 1300), according to embodiments of the invention. Other embodiments of a method of processing an OWL, for example, variations of the method 1800, are possible and are intended to fall within the scope of the invention.

It should be appreciated that all of the entries in the OWL should be for write operations that were received after the activation instruction in the step 1602 and before logging of write operations was stopped in 1614, and before the point-in-time represented by the snapshot. Thus, each logged write operation may be processed as if it occurred before the activation of the snapshots in the step 1610, e.g., before the snapshot sequence number (SN) of its LSU was incremented. Accordingly, the logged entries (e.g., in the OWL 1300) may be processed to determine if any snapshot information needs to be updated to reflect the occurrence of one or more logged write operations before activation of the snapshot.

In a step 1802, it may be determined whether there is a next entry in the OWL. On a first pass through the steps 1802-1808, this means checking the first entry in the OWL, which equates to determining whether there are any entries—i.e., whether there are any outstanding write operations. If not, the method 1800 may end. If it is determined that there is a next entry in the OWL, then in a step 1804, it may be determined whether snapshot information needs to be updated for the LSE specified by the OWL entry. For example, it may be determined whether the write operation that caused the OWL entry to be made was a first write operation to the LSE since a last snapshot of the LSU was taken, where the last snapshot taken of the LSU was the snapshot taken immediately preceding the current snapshot activated in the step 1610. Such a determination may be made in a step 1804 by determining whether the current snapshot sequence number (SN) of the LSE of the OWL entry is less than the previous SN of the LSU prior to being incremented in the step 1610. The current SN of the LSE may be determined by accessing the sequence number table 130.

If it determined in the step 1804 that the current SN of the LSE of the OWL entry is less than the previous SN of the LSU prior to being incremented in the step 1610, then snapshot information, including snapshot metadata and snapshot data, may be updated in a step 1806, for example, as described in relation to the method 1350 of FIG. 12. In a step 1807, the OWL entry may be removed, and in a step 1808 the LSU outstanding write count of the LSU of the OWL entry and the outstanding write count of the LSE of the OWL entry may be decremented, e.g., in the LSU OWC 1400 and LSE OWC 1500, respectively. After performance of the step 1808, the method 1800 may return to the step 1802 to process a next entry, if any, of the OWL.

If it determined in the step 1804 that the current SN of the LSE of the OWL entry is not less than (e.g., equals) the previous SN of the LSU prior to being incremented in the step 1610, then the write operation of the OWL entry was not the first write to the LSE since the last snapshot was taken. Accordingly, the snapshot information for the LSE may not be updated and the method 1800 may proceed to the step 1807. The write operation of the OWL entry may not be the first write to the LSE since the last snapshot was taken because of a write operation to the LSE that was received before the logging started in the step 1608, or was received after the logging started and the logged OWL entry for the write operation was already processed by the method 1800.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1220, 1350, 1600, 1700 and 1800, or parts thereof, may be implemented using one or more of the systems and/or data structures described in relation to FIGS. 1-10 and 13-15, or components thereof. For example, each of the methods 1220, 1350, 1600, 1700 and 1800, or parts thereof, may be implemented using one or more directors 37a-n. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
   receiving an instruction to activate a first snapshot for one or more logical storage units including a first logical storage unit;
   in response to receiving the instruction, initiating logging of write operations received for the one or more logical storage units;
   in response to completing activation of the first snapshot, stopping the logging of the write operations;
   processing one or more logged write operations which are logged by said logging to determine whether there are one or more logged write operations that require updating snapshot information of the one or more logical storage units; and
   if there are one or more logged write operations that require updating the snapshot information, updating the snapshot information based on the one or more logged write operations; and
   wherein said logging of the write operations for the one or more logical storage units includes, for a first received write operation, recording a log entry specifying a first logical storage element specified by the first received write operation;
   wherein said completing activation of the first snapshot includes incrementing a snapshot value of the first logical storage unit from a previous snapshot value of the first logical storage unit, wherein the log entry specifies a first snapshot value of the first logical storage element at a time at which the first received write operation was received; and
   wherein determining whether there are one or more logged write operations that require updating the snapshot information includes comparing the first snapshot value of the first logical storage element to the previous snapshot value of the first logical storage unit, and wherein, if the first snapshot value is less than the previous snapshot value, the first received write operation requires updating the snapshot information.

2. The method of claim 1, further comprising:
   in response to receiving the instruction, setting a first flag indicating that the first snapshot is incomplete; and
   clearing the first flag after updating the snapshot information.

3. The method of claim 1, further comprising:
   after completing activation of the first snapshot, receiving a first write operation for a first logical storage element of the first logical storage unit;

determining whether there is at least one logged write operation for the first logical storage element that has not been processed yet; and if there is at least one logged write operation for the first logical storage element that has not been processed yet, holding processing of the first write operation.

4. The method of claim 3, further comprising:
after processing the one or more logged write operations, processing the held first write operation.

5. The method of claim 1, wherein said updating the snapshot information based on the one or more logged write operations includes:
moving data pointed-to by the first logical storage element for the first snapshot value; and
updating the first snapshot value of the first logical storage element to equal the previous snapshot value of the logical storage unit.

6. The system of claim 1, wherein said updating the snapshot information based on the one or more logged write operations includes:
moving data pointed-to by the first logical storage element for the first snapshot value; and
updating the first snapshot value of the first logical storage element to equal the previous snapshot value of the logical storage unit.

7. A system comprising executable logic that implements a method including:
receiving an instruction to activate a first snapshot for one or more logical storage units including a first logical storage unit;
in response to receiving the instruction, initiating logging of write operations received for the one or more logical storage units;
in response to completing activation of the first snapshot, stopping the logging of the write operations;
processing one or more logged write operations which are logged by said logging to determine whether there are one or more logged write operations that require updating snapshot information of the one or more logical storage units; and
if there are one or more logged write operations that require updating the snapshot information, updating the snapshot information based on the one or more logged write operations; and
wherein said logging of the write operations for the one or more logical storage units includes, for a first received write operation, recording a log entry specifying a first logical storage element specified by the first received write operation;
wherein said completing activation of the first snapshot includes incrementing a snapshot value of the first logical storage unit from a previous snapshot value of the first logical storage unit, wherein the log entry specifies a first snapshot value of the first logical storage element at a time at which the first received write operation was received; and
wherein determining whether there are one or more logged write operations that require updating the snapshot information includes comparing the first snapshot value of the first logical storage element to the previous snapshot value of the first logical storage unit, and wherein, if the first snapshot value is less than the previous snapshot value, the first received write operation requires updating the snapshot information.

8. The system of claim 7, wherein the method further includes:

in response to receiving the instruction, setting a first flag indicating that the first snapshot is incomplete; and
clearing the first flag after updating the snapshot information.

9. The system of claim 7, wherein the method further includes:
after completing activation of the first snapshot, receiving a first write operation for a first logical storage element of the first logical storage unit;
determining whether there is at least one logged write operation for the first logical storage element that has not been processed yet; and
if there is at least one logged write operation for the first logical storage element that has not been processed yet, holding processing of the first write operation.

10. The system of claim 9, wherein the method further includes:
after processing the one or more logged write operations, processing the held first write operation.

11. One or more non-transitory computer-readable media having software stored thereon that, when executed, performs a method comprising:
receiving an instruction to activate a first snapshot for one or more logical storage units including a first logical storage unit;
in response to receiving the instruction, initiating logging of write operations received for the one or more logical storage units;
in response to completing activation of the first snapshot, stopping the logging of the write operations;
processing one or more logged write operations which are logged by said logging to determine whether there are one or more logged write operations that require updating snapshot information of the one or more logical storage units; and
if there are one or more logged write operations that require updating the snapshot information, updating the snapshot information based on the one or more logged write operations; and
wherein said logging of the write operations for the one or more logical storage units includes, for a first received write operation, recording a log entry specifying a first logical storage element specified by the first received write operation;
wherein said completing activation of the first snapshot includes incrementing a snapshot value of the first logical storage unit from a previous snapshot value of the first logical storage unit, wherein the log entry specifies a first snapshot value of the first logical storage element at a time at which the first received write operation was received; and
wherein determining whether there are one or more logged write operations that require updating the snapshot information includes comparing the first snapshot value of the first logical storage element to the previous snapshot value of the first logical storage unit, and wherein, if the first snapshot value is less than the previous snapshot value, the first received write operation requires updating the snapshot information.

12. The one or more non-transitory computer-readable media of claim 11, wherein the method further comprises:
in response to receiving the instruction, setting a first flag indicating that the first snapshot is incomplete; and
clearing the first flag after updating the snapshot information.

13. The one or more non-transitory computer-readable media of claim 11, wherein the method further comprises:

after completing activation of the first snapshot, receiving a first write operation for a first logical storage element of the first logical storage unit;

determining whether there is at least one logged write operation for the first logical storage element that has not been processed yet; and if there is at least one logged write operation for the first logical storage element that has not been processed yet, holding processing of the first write operation.

14. The one or more non-transitory computer-readable media of claim 13, wherein the method further comprises:

after processing the one or more logged write operations, processing the held first write operation.

15. The one or more non-transitory computer-readable media of claim 11, wherein said updating the snapshot information based on the one or more logged write operations includes:

moving data pointed-to by the first logical storage element for the first snapshot value; and updating the first snapshot value of the first logical storage element to equal the previous snapshot value of the logical storage unit.

* * * * *